United States Patent [19]

Sugawara

[11] Patent Number: 5,367,567
[45] Date of Patent: Nov. 22, 1994

[54] SUBSCRIBER APPARATUS WITH RINGER GENERATOR FOR SENDING RINGER SIGNAL TO SUBSCRIBER LINE

[75] Inventor: Eiji Sugawara, Kawasaki, Japan

[73] Assignee: Fujitsu Limited, Kawasaki, Japan

[21] Appl. No.: 879,853

[22] Filed: May 6, 1992

[30] Foreign Application Priority Data

May 7, 1991 [JP] Japan ................... 3-101313

[51] Int. Cl.$^5$ .................. H04M 3/02; H04M 3/36; H04J 3/12
[52] U.S. Cl. .................... 379/252; 379/32; 379/134; 370/68.1
[58] Field of Search ............ 379/253, 252, 32, 33, 379/254, 255, 418, 134, 133; 370/68.1, 110.1

[56] References Cited

U.S. PATENT DOCUMENTS

| | | | |
|---|---|---|---|
| 3,601,551 | 8/1971 | Weber | 379/323 |
| 3,767,857 | 10/1973 | Colas et al. | 379/252 |
| 5,056,135 | 10/1991 | Ahn | 379/252 |

FOREIGN PATENT DOCUMENTS

| | | |
|---|---|---|
| 3023313 | 1/1981 | Germany . |
| 58-36061 | 3/1983 | Japan . |
| 3-38955 | 2/1991 | Japan . |

OTHER PUBLICATIONS

"Tone and Ringing Equipment BKL700", F. Vago, *Ericsson Review*, No. 1, 1986, pp. 18-23.

*Primary Examiner*—Thomas W. Brown

[57] ABSTRACT

A subscriber apparatus having working ringer generators and a standby ringer generator which is alternately used when there is a fault, wherein provision is made of a traffic monitoring unit which continuously monitors the traffic of calls terminating at the subscriber lines and a ringer switching unit which switches a working ringer generator to a standby ringer generator when it is judged that the number of the terminating calls exceeds an allowable number, whereby the apparent capacity of the working ringer generators is increased.

8 Claims, 10 Drawing Sheets

SUBSCRIBER APPARATUS WITH RINGER GENERATOR FOR SENDING RINGER SIGNAL TO SUBSCRIBER LINE

BACKGROUND OF THE INVENTION

1. Field of the Invention

The present invention relates to a subscriber apparatus provided with a ringer generator for sending a ringer signal to a subscriber line.

When a ringer signal is sent to call up a subscriber telephone or a subscriber terminal connected to a subscriber line and the subscriber responds, the transmission of the ringer signal is tripped. This ringer signal is hardly ever sent simultaneously to a large number of subscribers, so the equipment is provided in common to a number of subscribers.

2. Description of the Related Art

In general, working ringer generators are provided in common for a plurality of interface units. A standby ringer generator is provided for standby use for the working ringer generators. For example, if a fault occurs in a working ringer generator, the changeover contact changes over so that the ringer signal from the standby ringer generator is sent through the subscriber interface unit to the subscriber line instead of from the working ringer generator.

The probability of a ringer signal to be simultaneously sent to subscribers is several percent of all the subscribers. Therefore, by providing a number of working ringer generators commensurate with that low probability, it is possible to improve the efficiency of use of the ringer generator and in turn reduce the costs of the subscriber equipment. If a call occurs exceeding the probability of calling up subscribers simultaneously, the capacity of the ringer generators is exceeded, the level of the ringer signal drops, and it becomes impossible to call up the subscriber. To resolve this problem, it is sufficient to increase the number of working ringer generators installed, but this has the disadvantage of increasing costs.

SUMMARY OF THE INVENTION

Therefore, the present invention has as its object to enable output of a ringer signal normally to a subscriber line even when a call exceeding the probability of calling up subscribers simultaneously occurs, without increasing the cost of the subscriber equipment.

To attain the above object, the present invention provides a ringer switch unit which switches between a working ringer generator and a standby ringer generator and a traffic monitoring unit which monitors the traffic of the subscriber lines and is constituted so that if the traffic monitoring unit detects that a number of terminating calls are received exceeding the power of supply of a working ringer generator, the ringer switch unit switches from the working side to the standby side.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the prior art and the problems therein will be first described with reference to the related figures.

Figure 1:
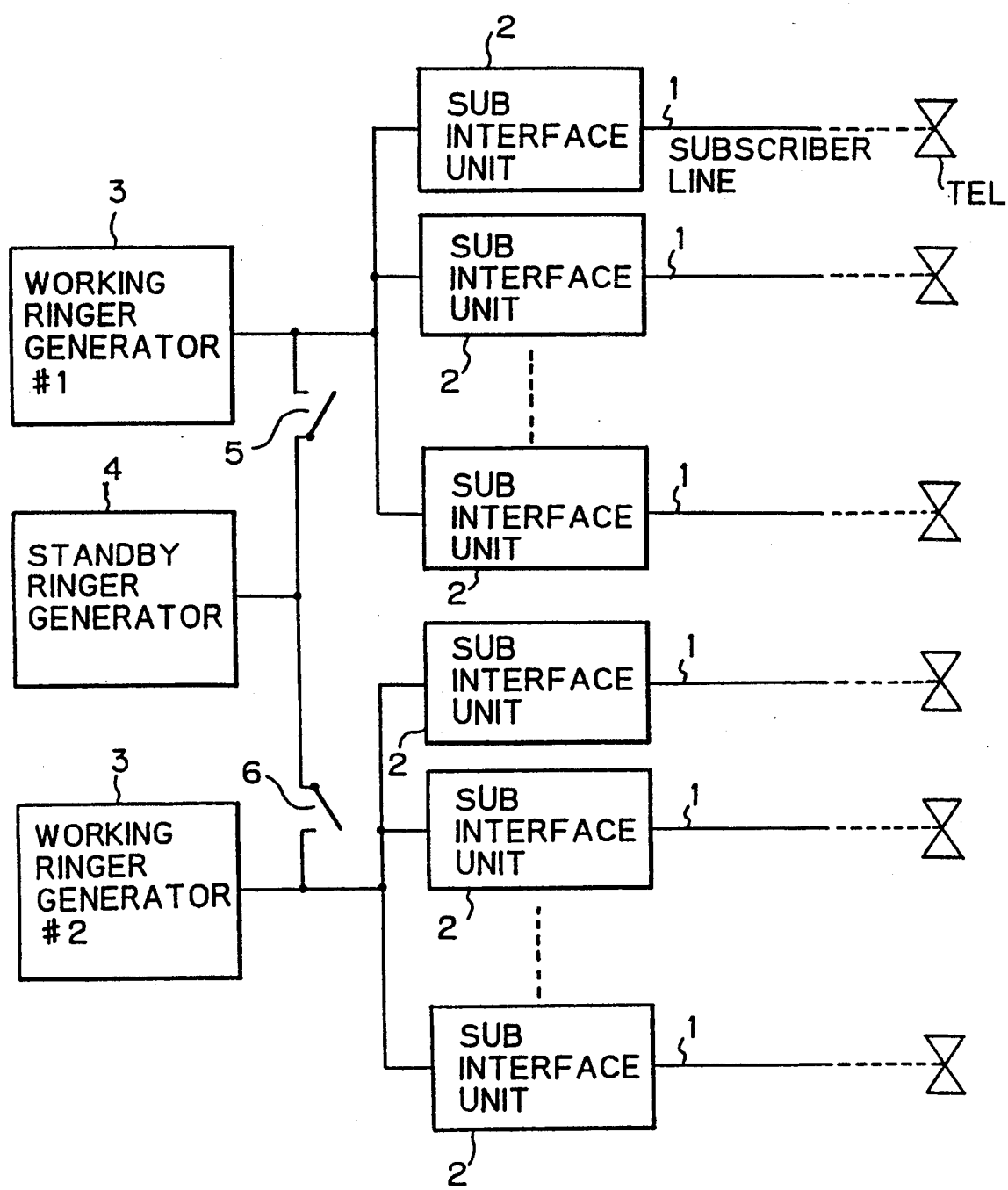
FIG. 1 is a block diagram of key portions of a prior art embodiment of a subscriber apparatus.

FIG. 1 is a block diagram of key portions of a prior art embodiment of a subscriber apparatus. Only the portion relating to the transmission of the ringer signal is shown, however. The portions relating to the speech signals are omitted. In the figure, reference numeral 1 is a subscriber line connected to a subscriber telephone TEL or a subscriber terminal, 2 is a subscriber interface unit accommodating the subscriber lines and including a BORSCHT function etc, 3#1 and 3#2 are working ringer generators (#1 and #2), 4 is a standby ringer generator, and 5 and 6 are switching contacts. Note that BORSCHT is an acronym comprised of the first letters of the following terms, among which the present invention relates in particular to the "R":

Battery feed
Over voltage protection
Ringing
Supervision
Code/decoder
Hybrid
Testing The working ringer generators 3#1 and 3#2 are respectively provided in common for pluralities of subscriber interface units 2. The standby ringer generator 4 is provided for standby use for the working ringer generators 3#1 and 3#2. For example, if a fault occurs at the working ringer generator 3#1, the switching contact 5 becomes ON and a ringer signal from the standby ringer generator 4 is sent through the subscriber interface unit 2 to the subscriber line 1 instead of from the ringer generator 3#1.

With the conventional subscriber apparatus as shown in FIG. 1, however, there were the problems mentioned above, that is, if a call occurs exceeding the probability of calling up subscribers simultaneously, the capacity of the ringer generators is exceeded, the level of the ringer signal drops, and it becomes impossible to call up the subscriber. To resolve this problem, it is sufficient to increase the number of working ringer generators installed, but this has the disadvantage of increasing costs.

Figure 2:
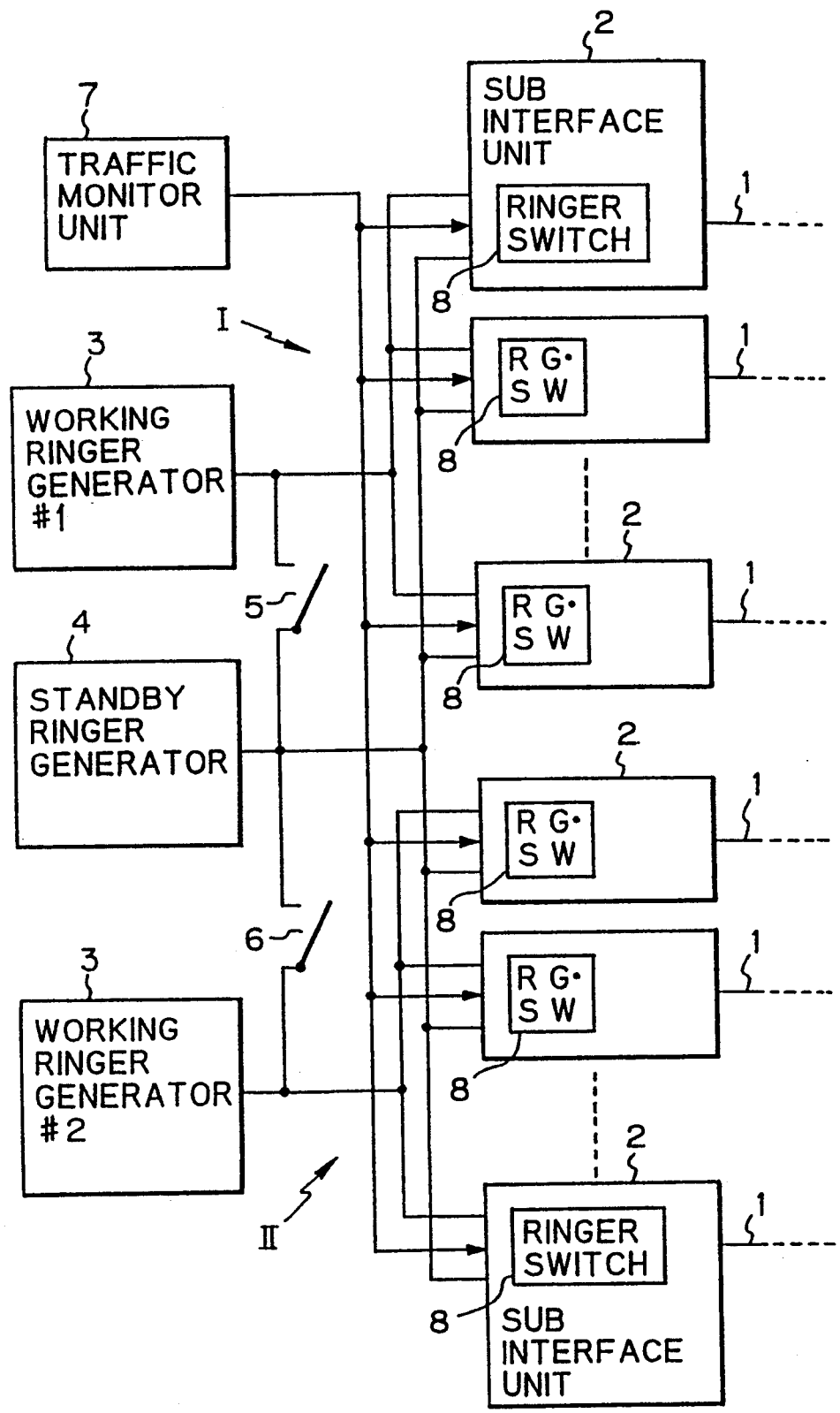
FIG. 2 is a block diagram of the basic construction of a subscriber apparatus based on the present invention.

FIG. 2 is a block diagram of the basic construction of a subscriber apparatus based on the present invention.

The subscriber apparatus of the present invention, explained with reference to FIG. 2, is provided with a plurality of subscriber interface units 2 accommodating subscriber lines 1, working ringer generators (#1 and

2) 3 provided corresponding to groups of subscriber interface units 2 divided into a number of groups, a standby ringer generator 4 connected by switching when a fault occurs in a working ringer generator 3 corresponding to a group, and a traffic monitoring unit 7 which monitors the traffic for each group. The subscriber interface unit 2 is provided with a ringer switch unit 8 which selects a ringer signal from the standby ringer generator 4 and sends it to the subscriber line 1 in accordance with information on detection of an increase in traffic from the traffic monitoring unit 7. Reference numeral 5 is an existing switching contact which switches to the standby ringer generator 4 when a fault occurs in a working ringer generator 3.

The present invention enables an increase in the supply capacity of the ringer signal by effectively using the existing standby ringer generator without increasing the number of working ringer generators.

In summary, the subscriber apparatus of the present invention includes a plurality of subscriber interface units 2 accommodating subscriber lines 1; a plurality of working ringer generators 3 provided in correspondence to groups of subscriber interface units divided in advance into a plurality of groups; a standby ringer generator 4 which is switched to a corresponding group when a fault occurs in the working ringer generator corresponding to that group; a traffic monitoring unit 7 which monitors the traffic of communication in the groups for each group; and a ringer switching unit 8 which outputs a ringer signal from a standby ringer generator to the subscriber line instead of a ringer signal from the working ringer generator when receiving information indicating detection of an increase in traffic from the traffic monitoring unit.

In FIG. 2, the case is shown where the subscriber interface units 2 are divided into two groups (I and II). Provision is made of the working ringer generators (#1 and #2) corresponding to these groups. Further, standby ringer generator 4 is provided in common for the working ringer generators 3. If a fault occurs in a working ringer generator 3, the standby ringer generator 4 is connected to the groups of interface units by switching to the standby ringer generator 4. The traffic monitoring unit 7 monitors if the traffic is beyond the capacity of the working ringer generators 3 for the groups to supply ringer signals. If the traffic is above the supply capacity, the ringer switch unit 8 of the subscriber interface unit 2 is controlled and a ringer signal from the standby ringer generator 4 is sent to the subscriber line 1. That is, when all the working ringer generators 3 are normal, the standby ringer generator 4 is in an idle state, so when the traffic increases, use is made of the ringer signal from the standby ringer generator 4; therefore it is possible to increase the supply capacity of ringer signals without increasing the number of the ringer generators 3.

Figure 3:
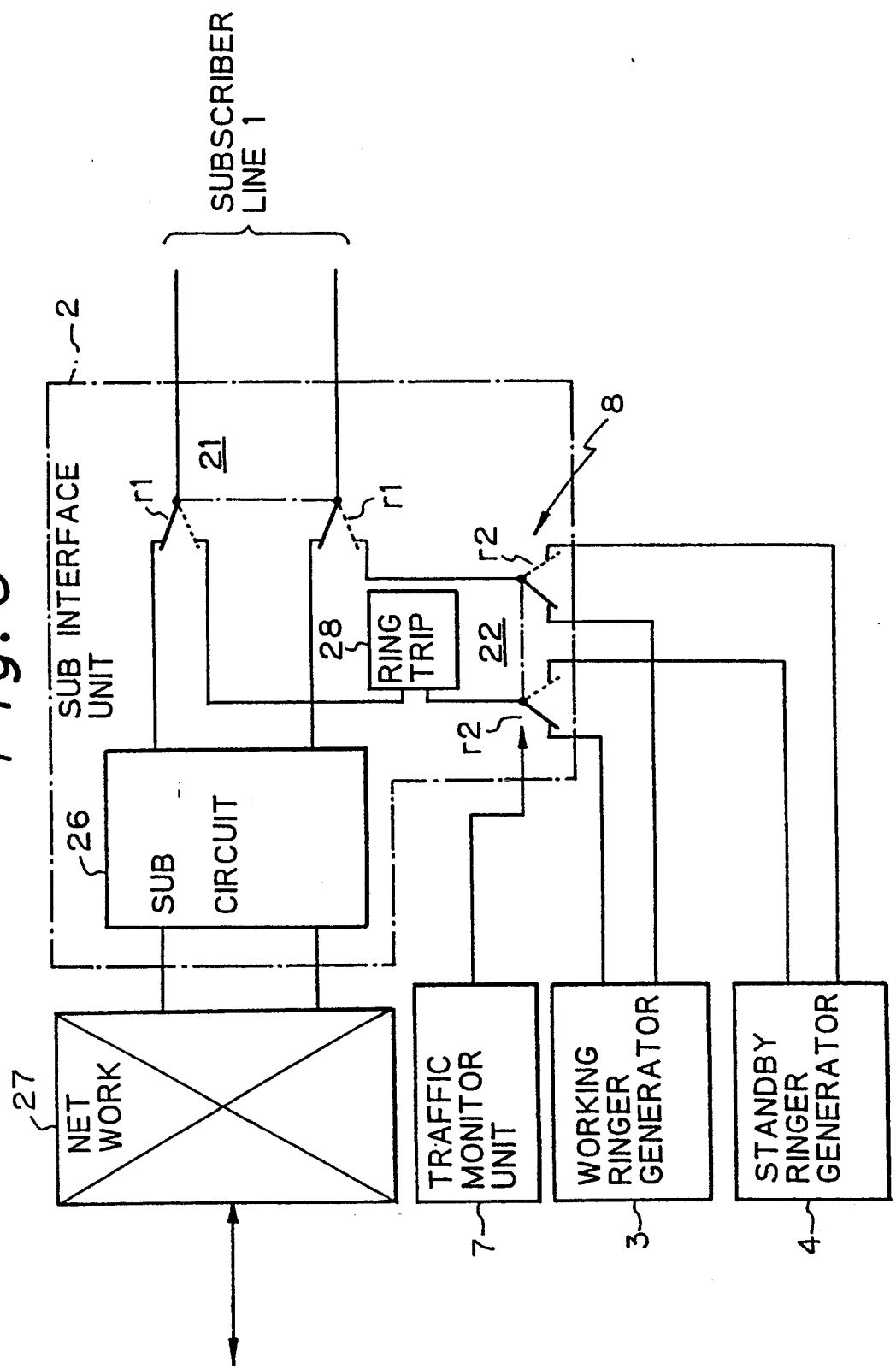
FIG. 3 is a diagram showing an embodiment of key portions of a subscriber apparatus based on the present invention.

FIG. 3 is a diagram showing an embodiment of key portions of a subscriber apparatus based on the present invention. As mentioned above, reference numeral 1 is a subscriber line, 2 is a subscriber interface unit, 3 is a working ringer generator, 4 is a standby ringer generator, and 7 is a traffic monitoring unit. The constituent elements first shown in this figure are a first switching contact pair (r1) 21, a second switching contact pair (r2) 22, a subscriber circuit 26, and an exchange speech path network 27. Numeral 28 denotes a ring trip circuit.

A plurality of subscriber interface units 2 are connected to the speech path network 27, but only one of them is shown. The plurality of the subscriber interface units 2 are divided into a plurality of groups (I and II in FIG. 2). The working ringer generator 3 is provided corresponding to each group, and common standby ringer generator 4 is provided with respect to the working ringer generators 3 of the groups. The second switching contact pair (r2) 22 correspond to the ringer switching units 8 in FIG. 2.

In the case of a call termination at a subscriber telephone (TEL in FIG. 1) connected to the subscriber line 1, the first switching contact pair (r1) 21 is switched from the illustrated position (solid line) and is connected to the ringer generator 3 through the second switching contact pair (r2) 22, for example, every other second, and a ringer signal of, for example, 20 Hz, is sent to the subscriber line 1 from the ringer generator 3. When the subscriber takes the phone off the hook in response to the call by the ringer signal; a known DC loop circuit is formed, this is detected by the ring trip circuit 28; the first switching contact pair (r1) 21 returns to the illustrated position (solid line), the calling originating subscriber and the call terminating subscriber are connected through the speech path network 27 and the subscriber circuit 26, and speech translation becomes possible.

The traffic monitoring unit 7 monitors the traffic for each group of the subscriber interface units 2 and when the traffic increases beyond the capacity of the ringer generators 3, the second switching contact pair (r2) 22 is switched to the illustrated position (solid line) by the information signal on detection of an increase in traffic from the traffic monitoring unit 7. By this, when there is a call termination to a subscriber telephone TEL connected to the subscriber line 1, a ringer signal from the standby ringer generator 4 is sent to the subscriber line 1. That is, even when there is an increase in traffic beyond the supply capacity of the working ringer generators 3, it is possible to continue sending of ringer signals by effectively making use of the standby ringer generator 4.

As seen above, according to the embodiment of FIG. 3, the ringer switching unit 8 is provided in each of the subscriber interface units 2.

Further, the ringer switching unit 8 is comprised of, in addition to an existing first switching contact pair (r1) 21 which selectively supplies the ringer signal or speech signals to the subscriber line, the second switching contact pair (r2) 22 which is connected at the supply side of the ringer signal, the second switching contact pair selectively choosing the working ringer generators 3 or standby ringer generator 4.

Figure 4:
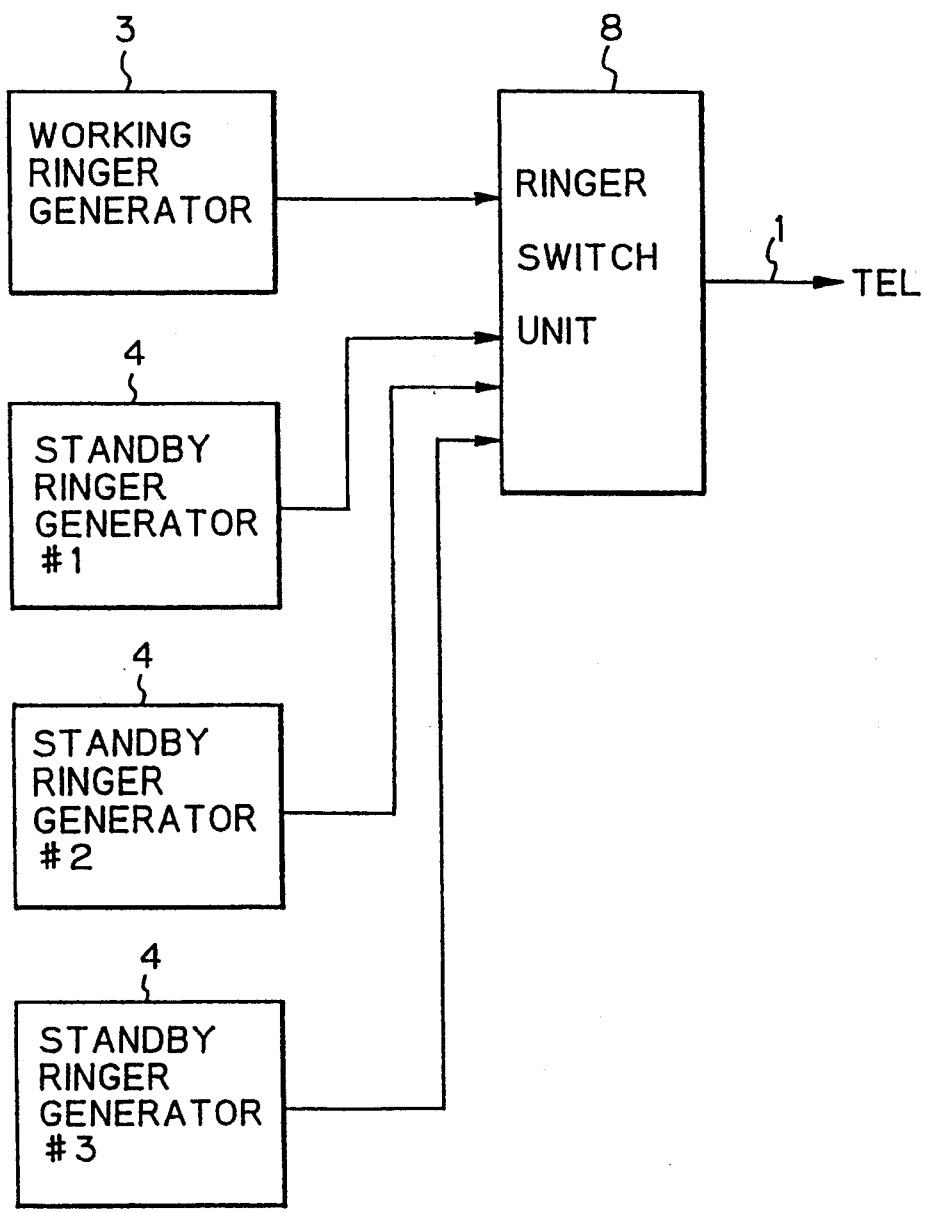
FIG. 4 is a diagram of another embodiment of a ringer switch unit.

FIG. 4 is a diagram of another embodiment of a ringer switch unit. According to this embodiment, a plurality of standby ringer generators 4 is provided (#1, #2, #3) and one of the plurality of standby ringer generators 4 is selected by the ringer switching unit 8. In this case, it is possible to choose one of three standby ringer generators selectively or to make two or three standby ringer generators operate simultaneously.

That is, in a large volume exchange, a large number of working ringer generators 3 are provided and, accordingly, a number of standby ringer generators 4 are also provided. In this case, it is possible to provide a ringer switching unit 8 which switches between the working ringer generators 3 and the plurality of standby ringer generators 4 for each group of subscriber interface units 2. By this, even with fewer working ringer generators 3, it is possible to secure a sufficient supply capacity of ringer signals at times of increased traffic. Further, the traffic monitoring unit 7 may be constructed to be able to monitor the traffic of the individual groups and, by monitoring the increase in traffic for a number of stages, it can adjust the allocation of ringer signals from the standby ringer generators 4 between groups.

Figure 5:
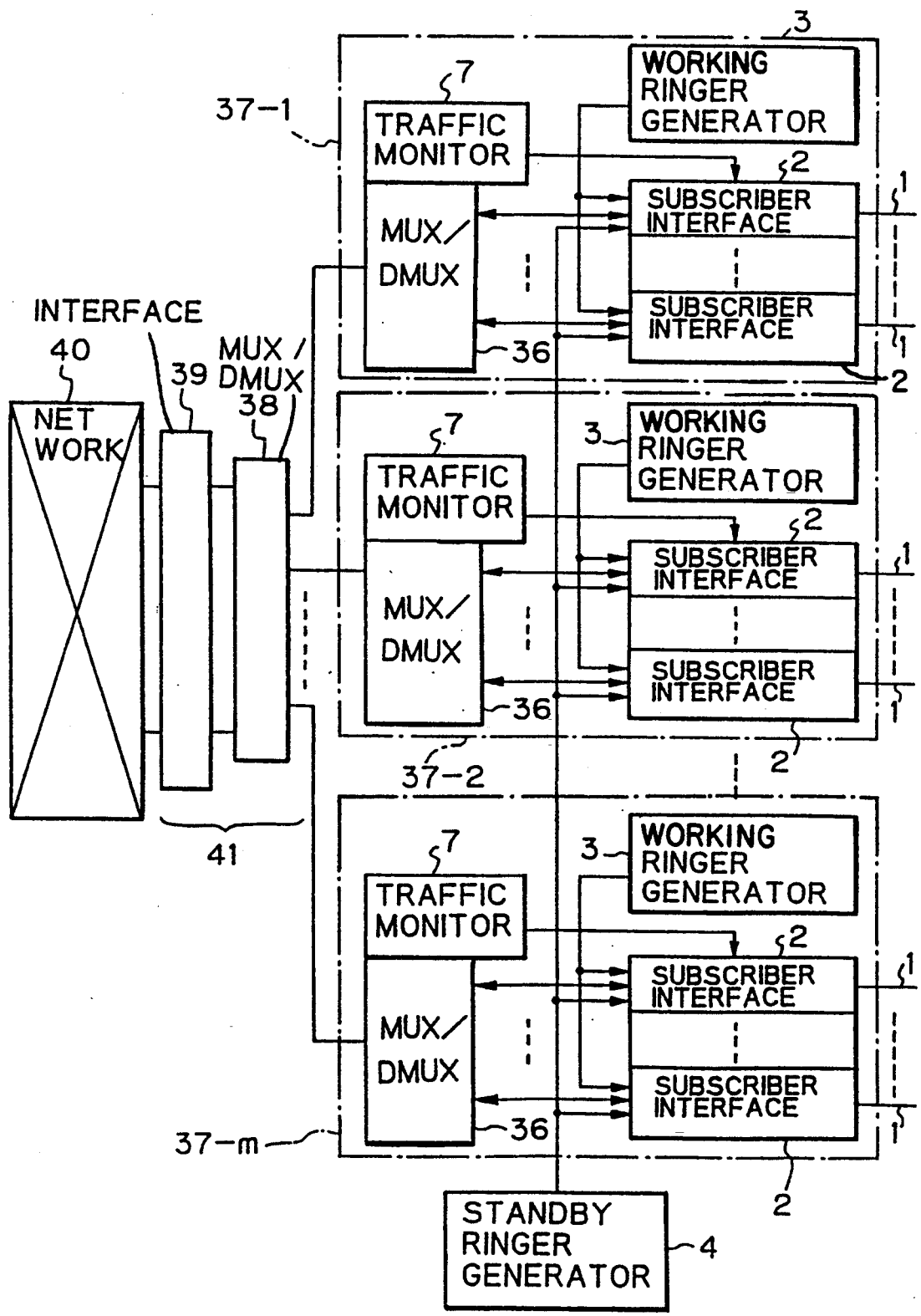
FIG. 5 is a diagram of an embodiment of a communication system to which the present invention is applied.

FIG. 5 is a diagram of an embodiment of a communication system to which the present invention is applied. As mentioned above, reference numeral 1 is a subscriber line, 2 is a subscriber interface unit, 3 is a working ringer generator, 4 is a standby ringer generator, and 7 is a traffic monitoring unit. Reference numerals 36 and 38 are multiplexer/demultiplexer units, 37-1 to 37-m are remote offices, 39 is an exchange interface unit, 40 is a speech path network in a central exchange office, and 41 is a multiplexed signal transmission line.

The case is shown where the multiplexer/demultiplexer units 26 of the remote offices 37-1 to 37-m and the multiplexer/demultiplexer unit 38 of the exchange are connected by multiplexed signal transmission lines and the subscribers are accommodated in the remote offices 37-1 to 37-m. The remote offices 37-1 to 37-m are extremely small sized unmanned offices which are relatively far from the exchange, but are located where subscribers are relatively concentrated. Also, the remote offices 37-1 to 37-m are positioned relatively close in distance to the subscribers. For example, this corresponds to a digital loop carrier system in the U.S.

The remote offices 37-1 to 37-m are provided with subscriber interface units 2 accommodating a number of subscriber lines 1, working ringer generators 3, traffic monitoring units 7, and multiplexer/demultiplexer units 36. Therefore, the remote offices 37-1 to 37-m correspond to the groups comprised of the plurality of the subscriber interface units in the previous embodiment. Note that the subscriber interface units 2 are provided with ringer switching units (ringer switching unit 8 in FIGS. 2, 3 and 4) controlled by the information on detection of increased traffic from the traffic monitoring units 7, but illustration of ringer switch units is omitted in FIG. 5. Further, the standby ringer generator 4 is provided in common for the working ringer generators 3 of the remote offices 37-1 to 37-m. The operator for switching and connecting the standby ringer generator 4 when a fault occurs in a ringer generator 3 is omitted from the the description of FIG. 5, but has been described in connection with FIG. 2.

For example, when a call terminates at a subscriber accommodated in a subscriber interface unit 2 in the remote office 37-1, call information is sent from the multiplexer/demultiplexer unit 38 of the exchange through the multiplexed signal transmission line 41 to the remote office 37-1. This is received by the multiplexer/demultiplexer unit 36 of the remote office 37-1, whereupon the subscriber interface unit 2 is controlled. In this case, when no increase in traffic is detected by the traffic monitoring unit 7, the ringer signal from the working ringer generator 3 is sent to the call terminating subscriber through the subscriber line 1. The subscriber interface unit 2 monitors the presence of a response of the call terminating subscriber and when there is a response to the call by the ringer signal, trips the transmission of the ringer signal.

The traffic monitoring units 7 of the remote offices 37-1 to 37-m, when detecting an increase in traffic beyond the capacity of their own working ringer generators 3, control the ringer switching units in the subscriber interface units 2 to switch from their own working ringer generators 3 to the standby ringer generator 4 so as to send a ringer signal from the standby ringer generator 4 to the subscriber line 1. Therefore, even when the traffic goes beyond the capacity of the ringer generators 3, it is possible to send a ringer signal to make a call.

Therefore, the standby ringer generator 4 acts as a standby for the ringer generators 3 of the remote offices and also acts in an auxiliary fashion when the traffic increases beyond the capacity of the ringer generators 3, so that it is possible to increase the supply capacity of ringer signals without increasing the number of the working ringer generators 3.

Figure 6:
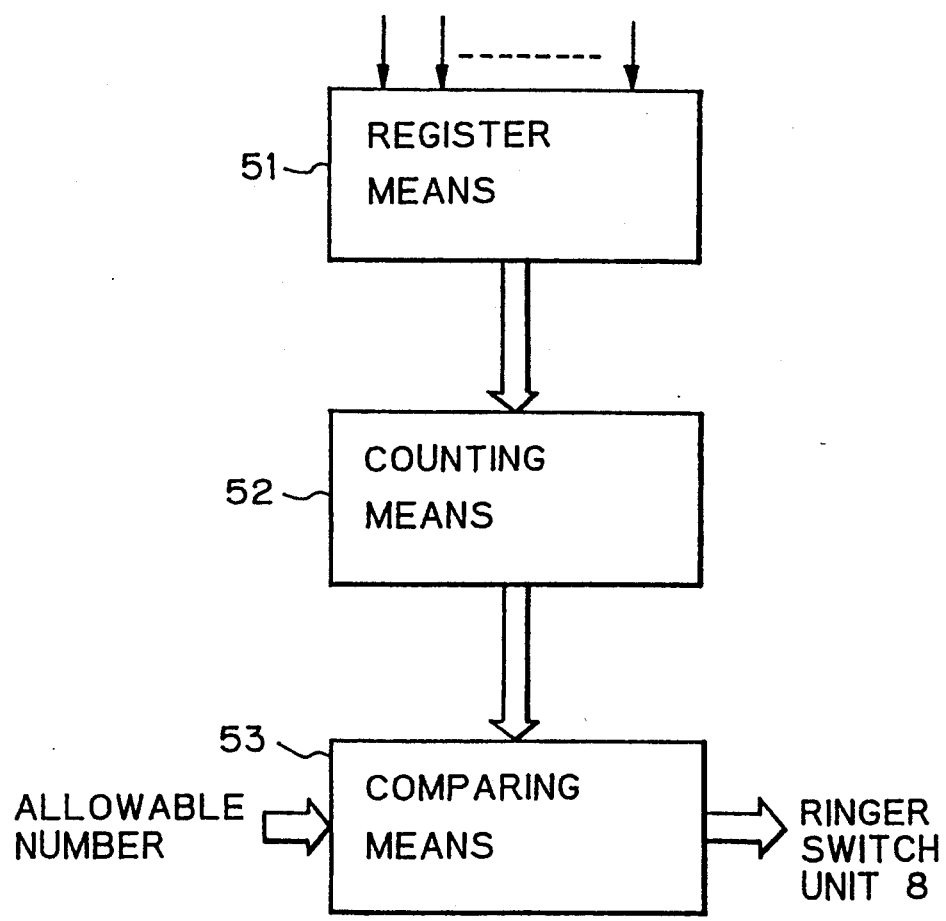
FIG. 6 is a diagram of an embodiment of the structure of a traffic monitoring unit.

When the remote offices 37-1 to 37-m are relatively large in size, one may divide the subscriber interface units 2 into a number of groups as shown in FIG. 1 at the remote offices 37-1 to 37-m and provide standby ringer generators 4 for each of the remote offices 37-1 to 37-m. Further, the case was shown of traffic monitoring units 7 provided in accordance with the remote offices 37-1 to 37-m, but when the central exchange office has a function allowing it to monitor the traffic for the remote offices 37-1 to 37-m, it is possible to sent information on detection of a traffic increase from the exchange to the remote offices as control information, FIG. 6 is a diagram of an embodiment of the structure of a traffic monitoring unit. As shown in the figure, the traffic monitoring unit 7 includes a register means 51 displaying at each instant of time information on whether or not there is a terminating call for each subscriber line for each group of subscriber interface units 2; a counting means 52 counting the current value of terminating calls based on the information of the register means 51; and a comparison means 53 which judges whether or not the number of terminating calls counted by the counting means 52 exceeds a predetermined allowable value or not; the ringer switching unit 8 being actuated right after it is determined that the allowable value has been exceeded.

Figure 7:
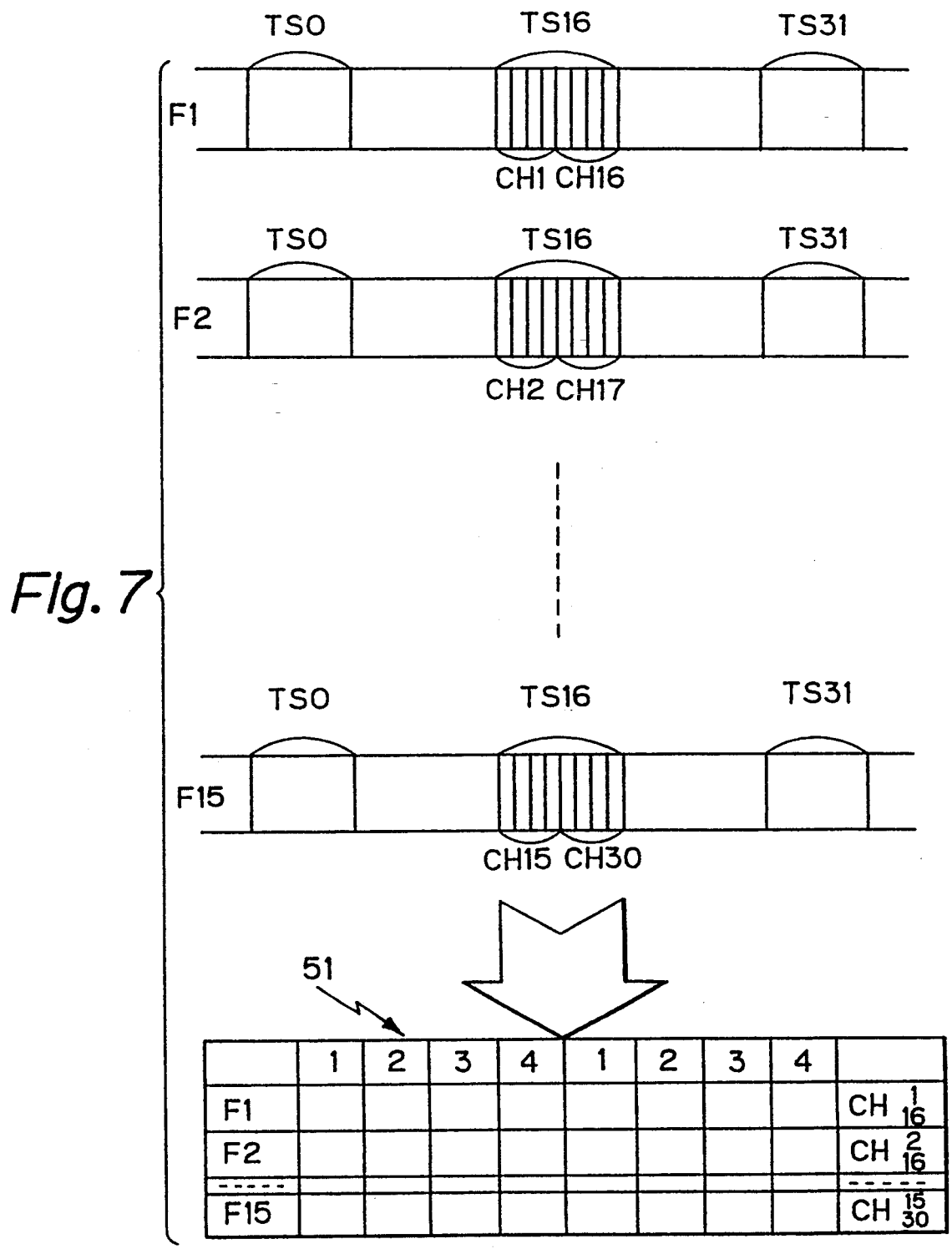
FIG. 7 is a diagram of an embodiment of a register means and a frame signal.

FIG. 7 is a diagram of an example of a register means and a frame signal. The example in the figure is of a known PCM-30CH system. In this PCM-30CH system, a multiframe construction including a first frame (F1) and a second frame (F2) through 15th frame (F15) is used. In the 16th time slot (TS) in the frames, control information is transferred in pairs of channels (CH), that is, CH1:CH16 and CH2:CH17 to CH15:CH30. Each channel is comprised of 4 bits.

The 4-bit control information at TS16 indicates that there is a terminating call when there is terminating call for the channels (subscribers). The terminating calls are sequentially held in the register means 51.

Figure 8:
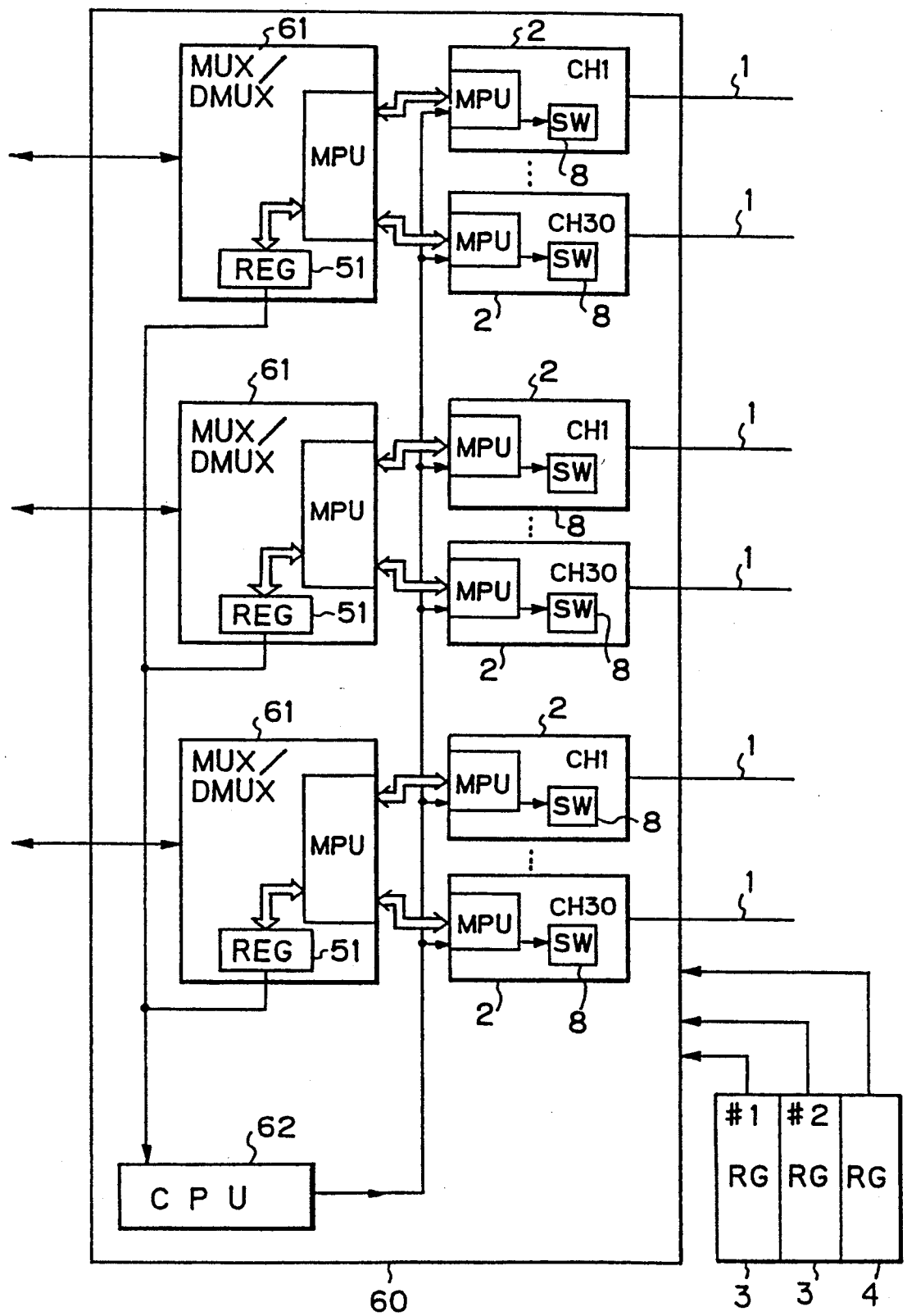
FIG. 8 is a diagram of an embodiment of the structure of a PCM-30CH system.

FIG. 8 is a block diagram of an embodiment of the PCM-30CH system. In the figure, reference numeral 60 is a card. On the card 60 are mounted a multiplexer/demultiplexer unit 61, subscriber interface units 2, a central processing unit 62, etc.

Between the unit 61 and the units 2 are connected microprocessor units (MPU). The MPU's perform the communication control while referring to the TS16 of FIG. 7. At this time the MPU's write the information of the terminating calls in the register means (REG) 51.

A counting means 52 and comparing means 53 cooperating with the register means 51 are preferably formed in the CPU 62.

At the lower right of the figure are shown the above-mentioned working ringer generators 3 and standby ringer generator 4.

Figure 9A:
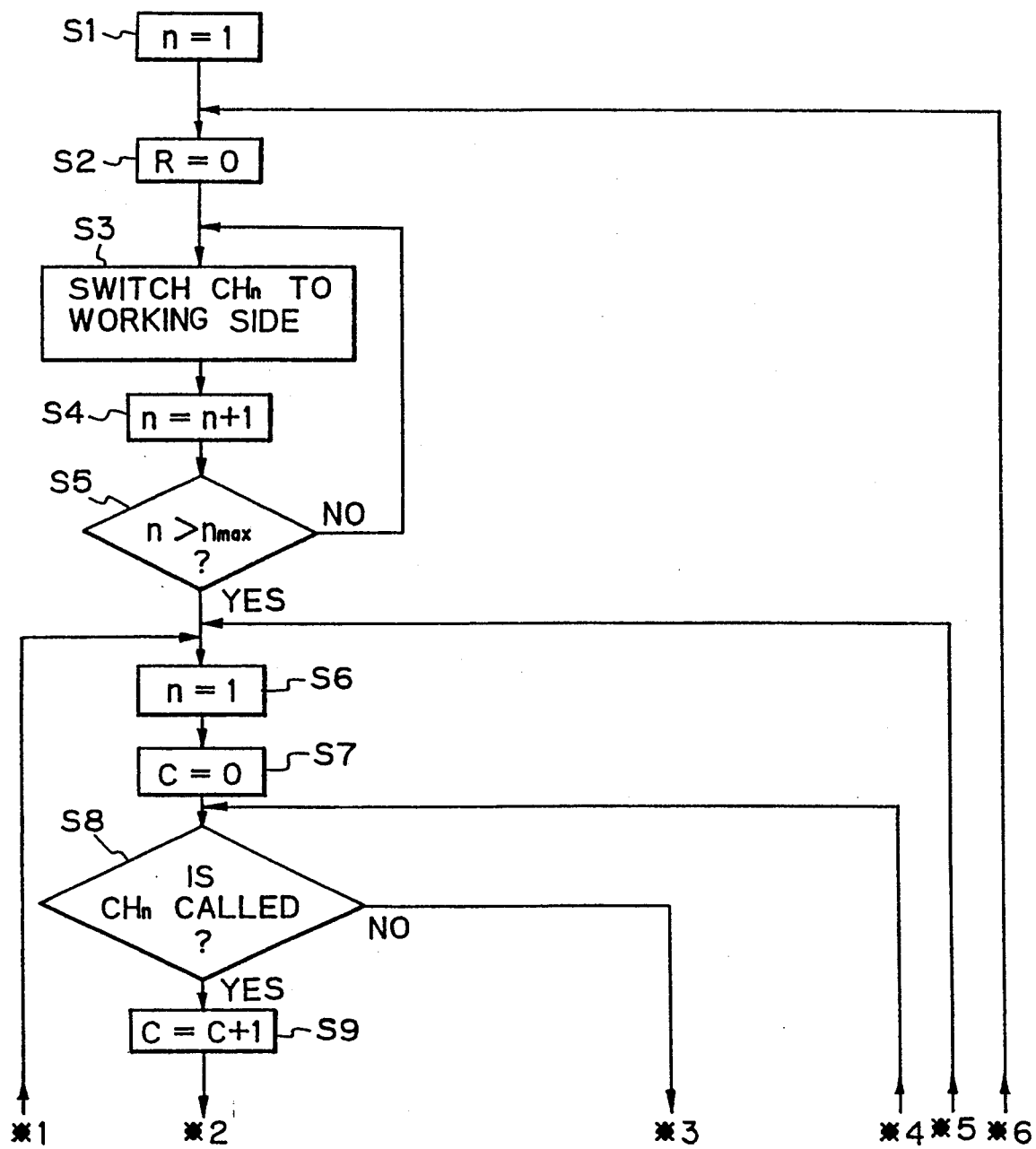
FIG. 9A and FIG. 9B are flow charts showing the operation of another specific embodiment of the traffic monitoring unit.
Figure 9B:
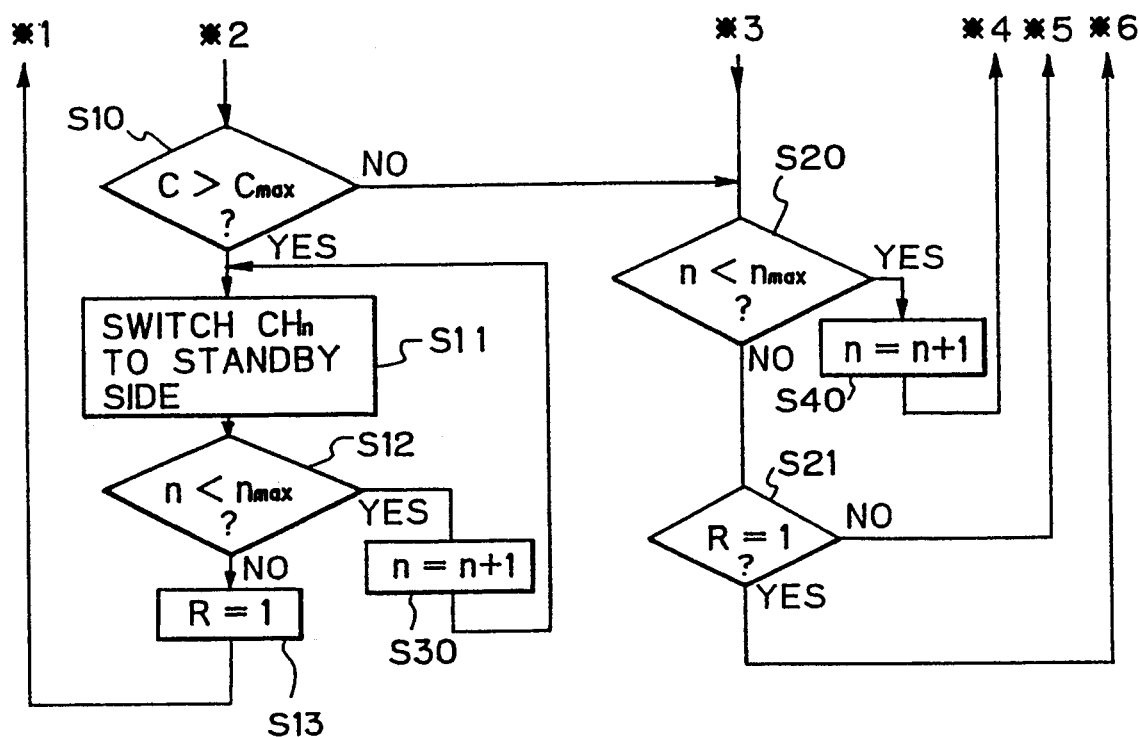

FIG. 9A and FIG. 9B are flow charts showing the operation of another specific embodiment of the traffic monitoring unit.

Step 1 (S1)

n indicates the number of the channels (CH (see CH1, CH2... in FIG. 7). First, the first channel (n=1) is designated.

Step 2 (S2)

R signifies the flag of the flag register. This is set at "1" when the standby ringer generator 4 is being used and "0" when it is not being used.

Step 3 (S3)

The connection of CHn is switched to the working ringer generator 3 side.

Step 4 (S4)

The switching operation of step 3 is performed for CH1, CH2, CH3, etc.

Step 5 (S5)

The switching operation of step 4 is continued until reaching the number ($n_{max}$) of the channels (CH) connected to the working ringer generator 3.

The operation of the above step 1 to step 5 corresponds to so-called initialization.

Step 6 (S6)

When the initialization is ended, the operation is started again from the first channel (CH1).

Step 7 (S7)

The number of terminating calls for the CH1 is counted (corresponding to 52 in FIG. 6). In the beginning, the count C is 0.

Step 8 (S8)

The presence of any terminating calls is investigated for the channel (CH1).

Step 9 (S9)

If there is a terminating call, the count C is incremented by 1 (C=C+1).

Step 10 (S10)

$C_{max}$ is the count (C) of the allowable number of calls for which the working ringer generator 3 can supply ringer signals normally.

If C does not exceed $C_{max}$, the routine proceeds to step 20.

Step 20 (S20)

It is investigated if the number (n) of the current channels has reached the maximum channel number ($n_{max}$).

Step 40 (S40)

If n has not reached $n_{max}$, then the value of n is incremented by 1 (n=n+1). Then the routine returns to step S8.

If the channel CH2 is not called up at step S8 (no terminating call), the judgement of step S20 is made and the flow of steps S40=S8→S9→S10→S20→S40... is repeated. When as a result of the judgement of step S10 by this repetition, $C>C_{max}$, the routine proceeds to step S11.

Step S11 (S11)

Since the number (C) of terminating calls exceeds the maximum number ($C_{max}$) which the working ringer generator 3 can supply signals for, the supply of ringer signals to the channel (CHn) receiving the latest terminating call is switched from the working ringer generator 3 to the standby ringer generator 4. This operation is the characteristic of the present invention.

Step 12 (S12)

The group of channels after the channel (CHn) where the switching was performed is connected to the standby ringer generator 4.

Step 30 (S30)

The switching of the above step 12 is performed in order channel by channel, until n reaches $n_{max}$.

Step 13 (S13)

The flag of the flag register (R) explained in step 2 is made "1". This shows that the standby ringer generator 4 is in use.

After this, the routine proceeds through S6→S7→S8→S20 to reach step 20. When n reaches $n_{max}$, the routine proceeds to step 21.

Step 21 (S21)

It is judged if the standby ringer generator 4 is in use. If not in use, the routine returns to step 6, while if in use, the ringer generator is forcibly returned to the working side (S6). Initialization is performed again. At this tithe, the allowable limit is exceeded, so a busy tone is sent back to the other party.

As explained above, the present invention switches from a working ringer generator 3 to a standby ringer generator 4 in the ringer switching unit 8 of the subscriber interface unit 2 by an information signal on detection of an increase in traffic from the traffic monitoring unit 7 and sends a ringer signal to the subscriber line 1 from the standby ringer generator 4, so that it can send a ringer signal making effective use of the standby ringer generator 4 even if the capacity of the working ringer generator 3 is exceeded due to a flood of local calls during disasters, some sort of special event, etc., so has the advantage of being able to increase the capacity of supply of the ringer signals economically without increasing the number of the working ringer generators 3.

I claim:

1. A subscriber apparatus comprising:
   a plurality of subscriber interface units (2) accommodating subscriber lines (1) and divided into a plurality of groups;
   a plurality of working ringer generators (3) each provided for a respective group of said subscriber interface units to transfer a first ringer signal thereto;
   at least one standby ringer generator (4) which is switched to a predetermined group of the subscriber interface units when a fault occurs in a working ringer generator provided for said predetermined group;
   at least one traffic monitoring unit (7) coupled to at least one of said groups of the subscriber interface units to monitor traffic of communication for said at least one of said groups of the subscriber interface units; and at least one ringer switching unit (8) which is connected to said at least one traffic monitoring unit and which routes a second ringer signal from the standby ringer generator to a subscriber line instead of said first ringer signal from said working ringer generator upon receiving a control signal indicating detection of an increase in traffic from said at least one traffic monitoring unit.

2. A subscriber apparatus as set forth in claim 1, wherein a ringer switching unit (8) is provided in each of said subscriber interface units (2).

3. A subscriber apparatus as set forth in claim 2, wherein each said ringer switching unit (8) is comprised of a first switching contact pair (21) at a connection of each subscriber interface unit to a respective subscriber line for transferring either communication signals or one of said first and second ringer signals to said subscriber line, a second switching contact pair (22) at a connection of each subscriber interface unit to a respective working ringer generator and said standby ringer generator for selectively choosing one of said working ringer generator (3) and said standby ringer generator (4).

4. A subscriber apparatus as set forth in claim 1, wherein a plurality of said standby ringer generators (4) are provided which are connected to said ringer switching unit (8) which selects at least one of said plurality of standby ringer generators and routes said second ringer signal therefrom to a respective subscriber line.

5. A subscriber apparatus as set forth in claim 1, wherein said at least one traffic monitoring unit (7) is comprised of:

a register means (51) displaying at each instant of time information on whether or not there is a terminating call for each subscriber line for each group of subscriber interface units (2);

a counting means (52) counting the current value of terminating calls based on the information of the register means; and a comparison means (53) which determines whether or not a number of terminating calls counted by said counting means exceeds a predetermined allowable value;

and further comprising means for actuating said ringer switching unit, said ringer switching unit (8) being actuated right after it is determined that the allowable value has been exceeded.

6. A subscriber apparatus as set forth in claim 1, wherein each group of said plurality of subscriber interface units (2) includes said ringer switching unit (8), and one of said working ringer generators (3) and each group are housed in a respective one of a plurality of remote stations (37) connected to a central exchange office (40) through a multiplex transmission line (41) and wherein said standby ringer generator (4) is provided in common for said plurality of remote stations.

7. A subscriber apparatus as set forth in claim 1, wherein a plurality of such traffic monitoring units (7) are provided each for each of the groups of said plurality of subscriber interface units (2).

8. A subscriber apparatus as set forth in claim 6, wherein said at least one traffic monitoring unit (7) is provided for all groups of said plurality of subscriber interface units (2).

* * * * *